Feb. 26, 1952

H. A. QUIST 2,587,525

FLOATING ROOF TANK GAUGE

Filed Oct. 28, 1947

INVENTOR.
HAROLD A. QUIST
BY
Busser and Harding
ATTORNEYS

Feb. 26, 1952     H. A. QUIST     2,587,525
FLOATING ROOF TANK GAUGE

Filed Oct. 28, 1947     3 Sheets-Sheet 2

*INVENTOR.*
HAROLD A. QUIST
BY

ATTORNEYS

Feb. 26, 1952     H. A. QUIST     2,587,525
FLOATING ROOF TANK GAUGE
Filed Oct. 28, 1947     3 Sheets-Sheet 3
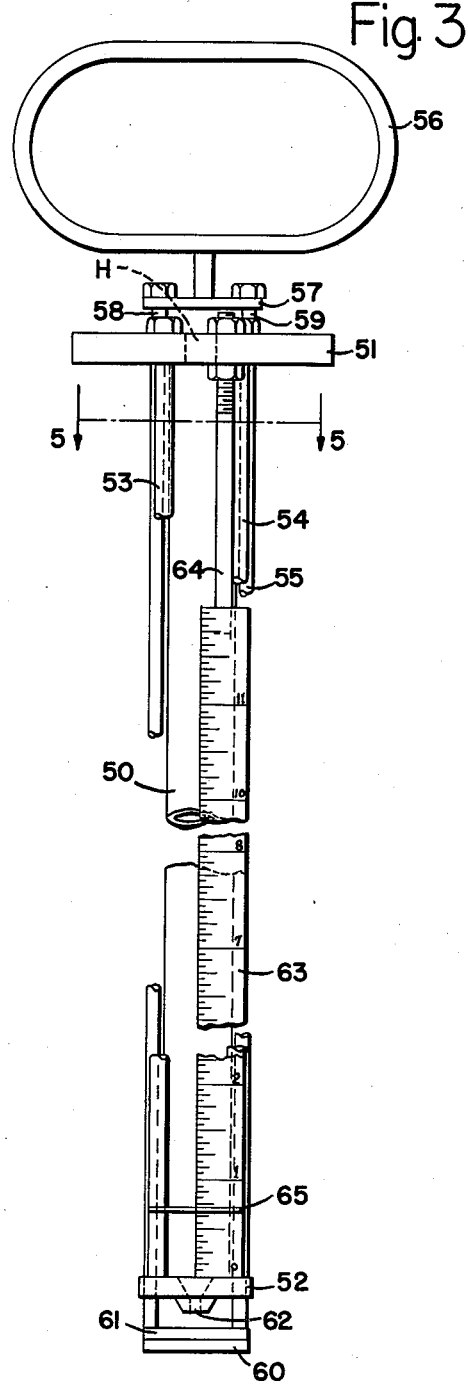
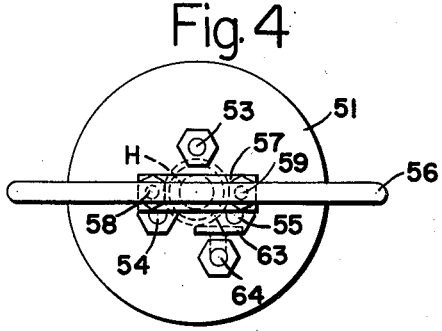
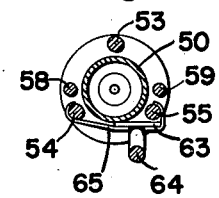
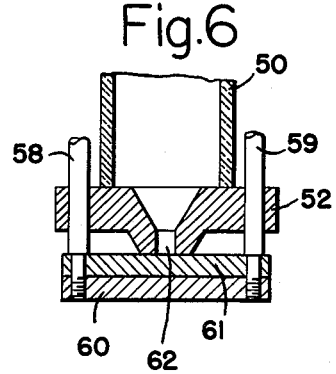
INVENTOR.
HAROLD A. QUIST
BY
*Busser and Harding*
ATTORNEYS Patented Feb. 26, 1952

2,587,525

UNITED STATES PATENT OFFICE 2,587,525

FLOATING ROOF TANK GAUGE

Harold A. Quist, Elkton, Md., assignor to Sun Oil Company, Philadelphia, Pa., a corporation of New Jersey Application October 28, 1947, Serial No. 782,534

6 Claims. (Cl. 73—290)

This invention relates to apparatus for measuring the liquid contents of storage tanks and is particularly adapted for use in measuring the contents of storage tanks with floating roofs.

The principal object of this invention is to measure the liquid contents of floating roof tanks quickly and accurately.

Another object is to provide methods of measurement which are adaptable to tanks of any diameter and to eliminate the error caused by tilted pontoons, especially in the larger tanks.

The invention involves the accurate measurement of the contents of a floating roof storage tank by determining the liquid contents which support the floating roof pontoon and adding to that quantity the measured liquid volume which surrounds the periphery of the pontoon in excess of the first computed amount. The calculation of the two quantities, the sum of which comprises the total liquid contents of the floating roof tank, is obtained from direct readings and reference to conversion tables calculated for the individual tank.

The measurement of the quantity of liquid contained in storage tanks of the floating roof type has been extremely difficult and presented a wide range of variable factors affecting accuracy such as temperatures; volatility of the stored liquid; floating of the pontoon roof due to inherent manufacturing errors, wind, water, snow and other loads; density of the liquid in the tank and friction with the side wall of the mechanical seal often necessary to conserve the contents. The problems arising from these variable conditions have been recognized and devices have been proposed to correct the effects and permit a direct reading of the liquid contents in such tanks on indicating scales. Two types of such devices, one where a manometer reading the pressure on the fluid created by the floating roof and the other where a mechanical float inserted in the pontoon roof, were used, may be mentioned. Both these devices are subject to the error caused by the tilting of the floating roof which was not corrected even assuming that the device was otherwise accurate. By employing the method and apparatus outlined here it is possible to determine the true depth of the liquid to within $\frac{1}{32}$ of an inch.

These and other objects of this invention as may appear from this specification will be best understood from a description of the accompanying drawings which illustrate a preferred embodiment thereof and in which:

Figure 3 is an elevation partly broken away of an ullage rod.

Figure 4 is a plan view of the ullage rod.

Figure 5 is a cross section on line 5—5 of Figure 3.

Figure 6 is a partly broken away view of the valve member of the ullage rod.

Figure 1:
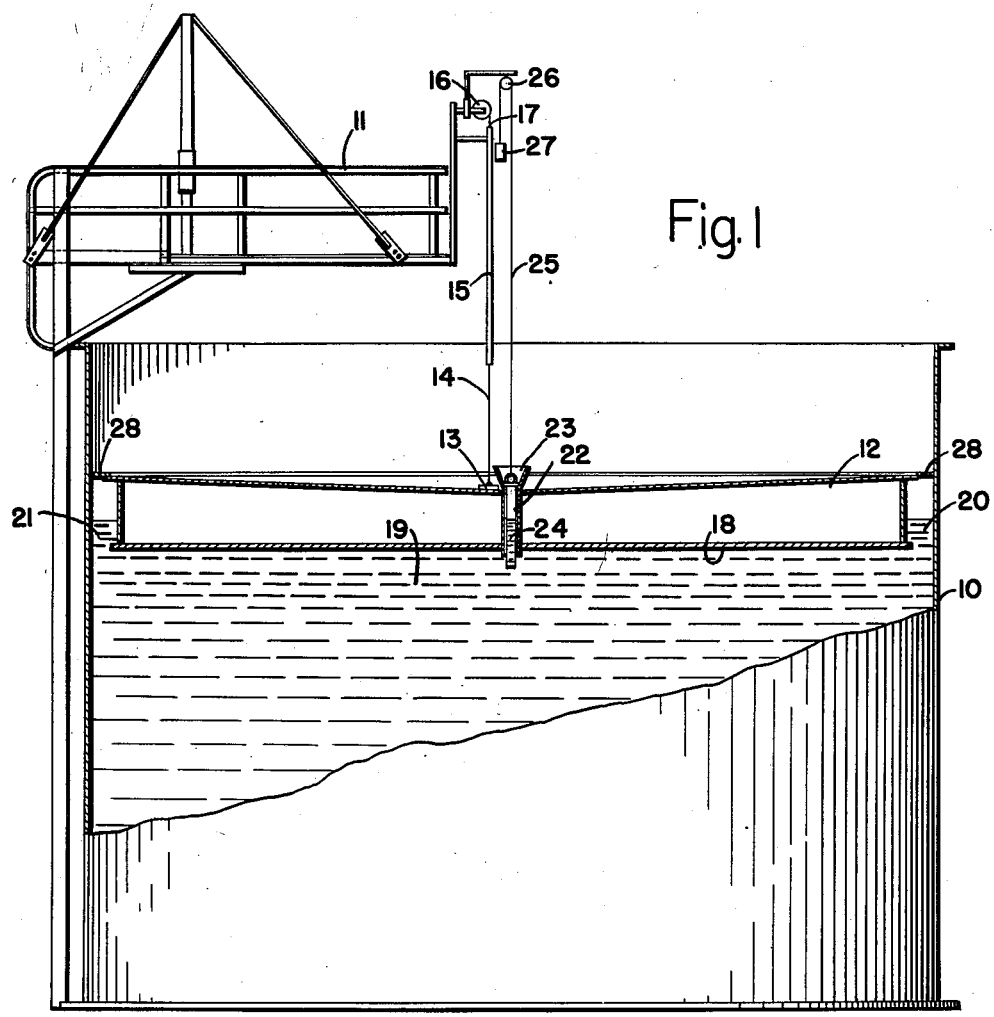
Figure 1 is an elevation in section of the measuring device on a smaller diameter tank.

In gauging the contents of storage tanks with floating roofs it is necessary to eliminate the error of measurement which is caused by the tilting of the floating roof pontoon. This is done by either measuring the point of average depth of the floating roof above the bottom of the tank or by averaging several well spaced readings about the pontoon. Figure 1 illustrates the floating roof storage tank 10 of smaller diameter where it is possible to construct a cantilever platform 11 from the periphery of the tank 10 to allow the operator to gauge over the center of the roof pontoon. Attached at the mid-point 13 is a graduated tape 14 passing upward through aluminum pipe 15 to a self-winding wheel 16 with sufficient tension to keep tape 14 tight.

A reference point 17, here taken as the upper edge of aluminum tube 15 placed at average eye height, is the datum plane for the measurement of the contents of tank 10.

Floating roof pontoon 12 is fabricated with the underside 18 which is supported by the stored liquid 19 substantially free of irregularly shaped pockets. In this manner the liquid displaced by the pontoon 12 which is forced around the periphery and fills inside openings such as shown at points 20 and 21 is of a depth equal to that in gauge tube 22 in the center of the floating roof pontoon 12 adjacent mid-point 13 where graduated tape 14 is attached. A flared funnel opening 23 is attached to the upper end of gauge tube 22 to guide the ullage rod 24 into gauge tube 22 as it is lowered to take a reading. A flexible line 25 suspends the ullage rod from a sheave or pulley 26 over which it is balanced by weight 27. To complete the floating roof pontoon 12 a flexible gasket type peripheral seal 28 is attached to the edge of the pontoon to press against the tank walls.

Figure 2:
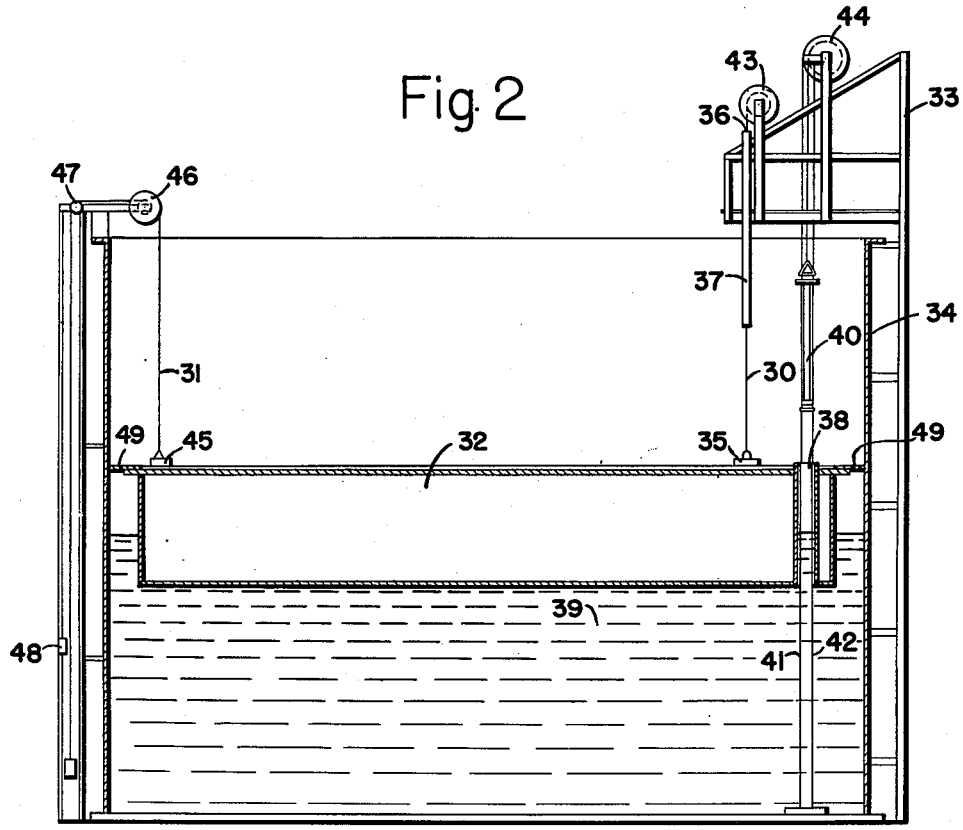
Figure 2 is an elevation in section of the measuring device on a larger diameter tank.

Figure 2 shows the application of the principles of these methods of measuring to larger diameter tanks of the floating roof type where it is not practical to construct cantilever platforms to make the center of the roof pontoon accessible. Although described here, the disclosure represented by this figure is not claimed in this application but is reserved and forms a divisional case, application Serial No. 103,218, filed July 6, 1949.

As an elementary requirement it is still necessary to correct the reading of the elevation of the roof pontoon for any tilt. This has been accomplished by using two tapes 30 and 31 placed diametrically opposite to each other on the floating roof pontoon 32. Constructed in a manner similar to that shown in discussing Figure 1, a platform 33 is mounted above storage tank 34 to enable an observer to read the elevation of point 35 on pontoon 32 as indicated at datum plane 36 on the upper edge of aluminum tube 37.

Adjacent point 35 on pontoon 32 where tape 30 is attached, a gauge tube 38 is open to the supporting liquid 39 and to admit the ullage rod 40 to be lowered therein on guide wires 41 and 42. Mounted on the platform 33 are two self-winding wheels 43 and 44 which respectively keep tape 30 tight for the elevation reading at point 35 of pontoon 32 and raises and lowers the ullage rod 40 to take liquid depth reading in gauge tube 38.

Diametrically opposite from point 35 where tape 30 is attached to pontoon 32 a second tape 31 is fastened to the pontoon at point 45. This measuring tape is shown as traversing pulleys 46 and 47 to the outside of tank 34 where it is dropped downward to a reading station 48. If it is not desired to use this form of construction, the platform device disclosed above for reading the first tape 30 may be repeated on this side of the tank. Finally, peripheral seals 49 complete the pontoon structure.

Figures 3, 4, 5 and 6 show several views in detail of the structure and operating parts of the ullage rod which typifies the preferred embodiment of the device for use in measuring the contents of a floating roof storage tank as outlined here. It is fully described and claimed in application Serial No. 786,911 filed November 19, 1947. The description is given briefly here in order to disclose a complete and operating appliance. Glass tube 50 is mounted between upper cap 51, vented by hole H, and lower cap 52 and retained in place by said caps held by the three rods 53, 54 and 55. A handle 56 is attached to a yoke 57 which is coupled to valve member 60 by sliding rods 58 and 59. The top of valve member 60 is faced with a gasket 61 which forms a seal with the opening 62 when the ullage rod is closed. A scale 63 is mounted on the glass tube 50 and is held in position against the glass tube by bent rod 64 and brass wire clips 65.

The underlying principles in the operation of the gauging devices detailed above are the same whether several tapes are attached to the floating roof around the periphery, or a single tape is attached at the mid-point of the pontoon. The object of all the readings taken of the relative position of the floating pontoon is to determine the average depth of the stored liquid below the under side or wetted face of the pontoon. The mid-point of a freely floating pontoon type roof, corrected for the depth of the pontoon structure, will indicate the fluid depth at that point and correct for tilt caused by uneven loading on the pontoon. In larger tanks, as indicated above, tapes placed diametrically opposite will present two readings which when averaged will indicate the correct depth of the liquid below the under face of the pontoon. With this depth known a table of volumes for equivalent depths will readily indicate the liquid contents below the pontoon.

It then remains to determine the quantity of liquid which is above the underside of the floating roof pontoon and then to add this quantity to the already determined volume in the storage tank. The depth to which the pontoon sinks in the stored liquid depends upon many factors, chief of which are original construction details, friction of side seals, external loading and density of the supporting liquid. It will be evident that not all of these factors are constant so that readings must be taken regularly of the depth of the displaced liquid. In the illustrated gauging device this reading is readily obtained by dropping the ullage rod into the gauging tube which is shown in the floating pontoon until the upper bracket 51 rests on the gauging tube. This places the ullage rod in position to measure the liquid above the under side or lower surface of the pontoon. With the body of the ullage rod, thus suspended, further release of the suspending line will permit the handle 56 to descend, in turn dropping valve member 60 from the opening 62. After a short period of time the line suspending the ullage rod being pulled up, lifts the handle 56 which, in turn, closes the valve member 60 and retains an amount of liquid in the ullage rod equivalent to the depth of liquid which surrounds the pontoon above the under surface. The vent hole H permits the air in the rod to be exhausted, allowing the liquid to rise to the true depth. Where the gauging tube is in the center of the pontoon, as shown in Figure 1, the ullage rod reading will indicate the average liquid height above the underside of the pontoon. In the case of the larger diameter storage tanks where the gauging tube is placed near the periphery of the floating pontoon, it is necessary to correct the ullage rod reading in proportion to the difference in reading of the diametrically opposed tapes and thereby determine the average liquid height above the under surface of the pontoon. Reference to a prepared conversion table will correct the ullage rod depth to liquid content measure which can readily be added to the originally obtained quantity and an exact reading of the contents of the tank obtained.

The method and apparatus here disclosed affords an accurate measure of the contents of floating roof tanks. The content of the tank which supports the floating roof pontoon can be mathematically determined very closely and found by entering a prepared volume table with the tape measure reading. The greatest source of error in storage tanks of this type has always been in determining the effect of the floating roof pontoon on the stored liquid. This disclosure affords a method and apparatus which once calculated and volume tables prepared will automatically correct for pontoon tilt, manufacturing irregularities, friction, density of the liquid stored, the effect of the elements and other causes which have not been considered prior to this invention.

What I claim and desire to protect by Letters Patent is:

1. A device to measure the liquid contents of a floating roof storage tank comprising in combination, a tape adapted to read the height of the center of the floating roof surface in contact with the supporting liquid above the bottom of said tank, a pulley conducting said tape to a convenient reading station, a gauge tube open to the stored liquid in said tank in the floating roof proximate said tape, and an ullage rod to determine the depth of the displaced stored liquid as shown in the tube in said floating roof.

2. A liquid measuring device for tanks having a floating roof within said tank supported on the surface of the liquid comprising a gauging tube in the center of said roof to admit the liquid, roof elevation measuring means cooperating with said roof adjacent said gauging tube, and an ullage rod removably insertable in said gauging tube to determine the liquid displacement of the roof.

3. A liquid measuring device for tanks having a floating roof within said tank supported on the surface of the liquid comprising a gauging tube in the center of said roof open to admit the liquid; roof elevation measuring means including a graduated tape cooperating with said roof adjacent the gauging tube adjusted to read the elevation of the liquid contact surface of said roof above the bottom of the tank; a datum point positioned in fixed relation to said roof and said tank, adapted to receive said tape in measuring relation; and an ullage rod removably insertable in said gauging tube to determine the liquid displacement of the roof.

4. A liquid measuring device for tanks having a floating roof within said tank supported on the surface of the liquid comprising a gauging tube open to the liquid in the center of said roof, a cantilever platform extending from the wall of said tank over the floating roof to the center thereof, an ullage rod adapted to be suspended from said cantilever platform and enter said gauging tube to measure the displaced liquid elevation therein, a graduated tape attached to the top of said floating roof adjacent the centrally positioned gauging tube and extending upwardly to the cantilever platform whereby the elevation of the roof and the depth of the displaced liquid may be measured to determine the accurate liquid level in said tank and eliminate errors due to the tilt of said roof.

5. Means for measuring the liquid contents of storage tanks comprising the combination, with a tank adapted to contain the liquid, of a floating roof, the main body of which is hollow, within the tank supportable on the surface of the liquid and, when so floatably supported, partly submerged in the liquid; said hollow roof body being of smaller cross sectional area than the tank and centered within the tank; a tube, open at both ends, extending through the room from top to bottom at the approximate center thereof; means, engageable with the upper face of the roof, adapted to measure the height of the upper face of the roof adjacent the centrally located tube at its approximate center, from which measurement is determinable the depth of liquid up to the level of the center of the lower face of the roof; a gauge tube insertable into said first named tube through its upper end and means limiting its downward movement to a definite vertical position relative to the first named tube, said gauge tube adapted, when positioned as specified in the first named tube, to receive liquid to a height corresponding to the upper level of the liquid in the tank; and a scale in fixed relation to the glass tube; whereby from the height indicated by said scale and the hereinbefore measured determined depth of liquid the volume of liquid in the tank is calculable.

6. A device to measure the liquid contents of a floating roof storage tank comprising in combination liquid depth measuring means in contact with the floating roof adapted to indicate the height of liquid supporting said roof below a selected point thereon, a gauge tube open to the stored liquid in said tank through the floating roof at said selected point, and an ullage rod insertable in the gauge tube to measure the depth of the liquid displaced in floating said roof at said selected point.

HAROLD A. QUIST.

REFERENCES CITED

The following references are of record in the file of this patent:

UNITED STATES PATENTS

| Number | Name | Date |
|---|---|---|
| 2,086,645 | Staber | July 13, 1937 |
| 2,117,185 | Lynskey | May 10, 1938 |